H. PAULING.
APPARATUS FOR COMMINUTING CALCAREOUS SALTPETER, POTASSIUM OR MAGNESIUM CHLORID, AND THE LIKE.
APPLICATION FILED MAY 20, 1912.
1,075,722. Patented Oct. 14, 1913.
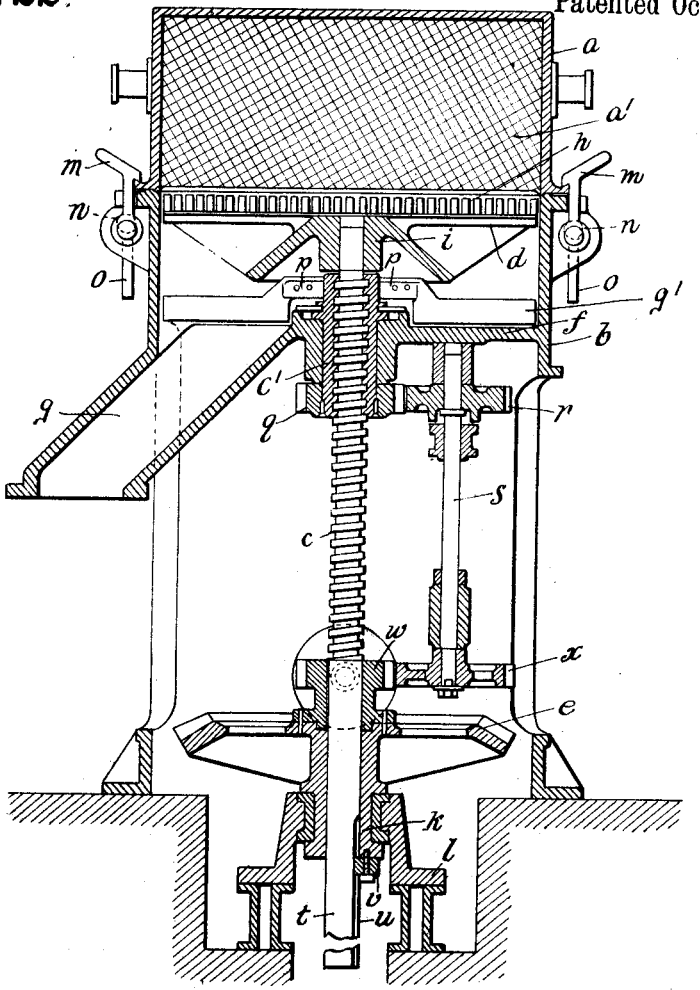
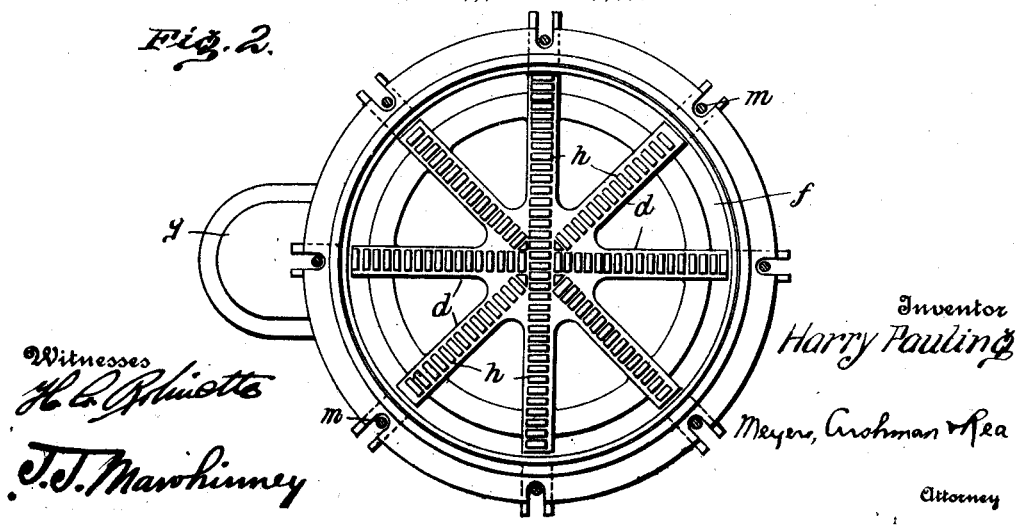

UNITED STATES PATENT OFFICE.

HARRY PAULING, OF COLOGNE, GERMANY, ASSIGNOR, BY MESNE ASSIGNMENTS, TO SOUTHERN ELECTRO-CHEMICAL COMPANY, A CORPORATION OF NEW JERSEY.

APPARATUS FOR COMMINUTING CALCAREOUS SALTPETER, POTASSIUM OR MAGNESIUM CHLORID, AND THE LIKE.

1,075,722.  Specification of Letters Patent.  Patented Oct. 14, 1913.

Application filed May 20, 1912. Serial No. 698,552.

*To all whom it may concern:*

Be it known that I, HARRY PAULING, a subject of the Emperor of Germany, residing at Cologne-on-the-Rhine, in the Kingdom of Prussia, German Empire, have invented new and useful Improvements in Apparatus for Comminuting Calcareous Saltpeter, Potassium or Magnesium Chlorid, and the like, of which the following is a specification.

My invention relates to an apparatus for reducing certain substances, such as calcareous saltpeter, potassium chlorid, magnesium chlorid, and the like, after the same are melted and solidified and thereby crystallized, to a granular form. In this connection it may be well to state briefly, a few facts relative to the manner in which substances of this character have heretofore been treated in practice for the purpose of reducing them to the granular form in which they are employed in the various arts. Calcareous saltpeter is obtained by saturating nitric acid with lime so as to form a salt, and then evaporating the excess of water from the salt by heating the salt to its boiling point, the salt while still heated and after losing its water by such evaporation being then cast into molds. Salts which require to be calcined or which will only give off the excess water they contain by being heated to such temperature as to melt the salts are, after being deprived of their excess water, as stated, poured into a receptacle and allowed to crystallize.

When substances of the kind above mentioned are treated as just stated, it is necessary to remove them from the molds, and this is done by a step known in this art as thawing, that is to say a strong heat is applied quickly to the wall of the mold so as to melt a small portion of the material in immediate contact with the mold. This being done practically the entire mass of the salt may be ejected from the mold in the form of a solid block. By a separate step this block, which is very hard, is placed in a breaker and broken up, after which it is ground in a mill to the desired degree of fineness.

My invention does not differ materially from those above described up to the point where the material is poured into the mold and there allowed to cool and become hard and crystalline. From this point in the operation, I apply to the block, while it remains in the mold, a device of special construction by aid whereof the material is operated upon, and thus reduced directly to granular form suitable for commercial use.

While my invention may be practised in various ways I find it convenient to use, for the purpose indicated, a particular apparatus which will now be described.

Reference is made to the accompanying drawing forming a part of this specification, and in which like letters indicate like parts.

Figure 1 is a substantially central vertical section through my improved apparatus showing the same in use. Fig. 2 is a plan view of the apparatus, the mold and its contents being removed.

The mold is shown at $a$, and has generally the form of a cup. The salt or material filling the mold is shown at $a'$. A casing $b$ having generally a cylindrical form constitutes a frame work for my device. Located centrally within the casing $b$ is a coarse threaded shaft $c$ which carries at its upper end a head $i$ provided with radially disposed arms $d$, and mounted upon the latter are knives $h$. A gear $e$ is splined upon the lower end of the shaft $c$, which is smooth. Rotation of the pulley $e$ causes the shaft $c$ to turn. The gear $e$ may be turned by power or by hand, as desired. Engaging the upper portion of the shaft is a horizontally rotatable but vertically immovable nut $c'$ through which the threaded portion of the shaft is free to work. As the shaft is rotated relatively to the nut, it is also raised. This nut is supported by a flange $f$ which has a substantially annular form, and serves as a floor for receiving the material as the same drops down upon it after being granulated. As the shaft is slowly rotated within the fixed nut, it is raised gradually. A spout $g$ extends into and is supported by the casing and leads obliquely upward to the flange or annular floor $f$. Clamps $m$ are employed for the purpose of detachably holding the mold in inverted position upon the casing $b$, as indicated in Fig. 1. The clamps $m$ are mounted on eccentrics $n$ journaled in the casing $b$ at its top, the eccentrics $n$ having levers $o$ by means of which the eccentrics $n$ may be turned to draw the clamps $m$ down upon the mold $a$. This arrangement insures the tightening of the mold $a$ upon the casing $b$. The pulley $e$ has a downwardly enlarged hub $k$ which is rotatably mounted in a fixed support $l$.

A wiper or sweeper $g'$ is moved over the floor $f$ to gather and deliver the cut particles of the block $a'$ into the spout $g$ through which the particles pass from the machine. The wiper or sweeper $g'$ comprises a plurality of radial scraper blades secured at their inner ends upon lugs $p$ radiating from the nut $c'$. The nut $c'$ has a gear $q$ fixed upon its lower end which meshes with a second gear $r$ of the same, or of a smaller diameter and which is keyed to a vertical shaft $s$. The lower end $t$ of the threaded shaft $c$ is smooth and has a longitudinal key-way $u$ receiving the key $v$ carried by the hub $k$ whereby the hub rotates, but does not move vertically with the shaft $c$. The hub $k$ of the gear $e$ also has a pinion $w$ fixed to the hub and meshing with the larger gear wheel $x$ secured to the lower end of the shaft $s$. With this arrangement, the turning of the gear wheel $e$ revolves the shaft $c$ and the pinion $w$ at the same time and at the same rate of speed. However, since the gear $x$ is larger than the pinion $w$ the shaft $s$ is turned at a slower rate of speed than the shaft $c$, and this relatively slow speed of rotation is imparted to the nut $c'$. This movement of the shaft $c$ and the nut $c'$, effects the turning of the shaft $c$ within the nut $c'$ and the consequent vertical movement of the shaft through the nut. The knives $h$ are thus raised and rotated against the block $a'$, and the wiper or sweeper $g'$ is rotated over the floor $f$. The shaft $s$ is mounted in suitable bearings $y$ disposed in one side of the casing $b$.

The operation of this apparatus is as follows: The salt having been heated, poured into the mold $a$ and allowed to cool, and thereby crystallized into a solid block $a'$ as above described, the mold is inverted and placed upon the top of the casing $b$, and there detachably secured in position by aid of the clamps $m$. The pulley $e$ being now rotated in any suitable manner, and the shaft $c$ is turned and slowly raised, the knives $h$, by scraping or cutting against the lower surface of the block of crystalline material, cut off small portions from the block, and these in the form of granulated material drop by degrees upon the flange or floor $f$. From here they are removed by aid of the rotary wiper the sweeper $g'$ and spout $g$. The material thus prepared is ready for the market and may, if desired, be separated into different grades which differ from each other in the respective fineness of the grains.

I do not limit myself to the use of the particular apparatus described, the scope of my invention being commensurate with my claims.

Having thus described my invention what I claim is:—

1. The combination with an invertible mold in which is cast a block to be cut, of a stationary supporting frame adapted to receive an overturned mold, block comminuting means disposed on the frame and adapted to advance into said mold, collecting and delivering means carried by the frame adapted to collect and deliver at one point particles cut from the block, and clamping means on the frame for engagement with the mold, said means being detachable from the mold whereby the mold may be quickly removed from the frame and other molds substituted therefor.

2. The combination with a mold in which is cast a block to be cut, a supporting frame adapted to receive the mold in overturned position, clamps carried on the frame detachably engaging the mold whereby other molds may be readily substituted therefor, block cutting means on the frame adapted to advance into the mold, and block-particle collecting and delivering means carried by the frame.

In testimony whereof I have hereunto set my hand in presence of two subscribing witnesses.

HARRY PAULING.

Witnesses:
RICHARD MERKEL,
LOUIS VANDORN.